G. M. LITTLE.
ARC LAMP ELECTRODE.
APPLICATION FILED SEPT. 3, 1907.
931,133.
Patented Aug. 17, 1909.
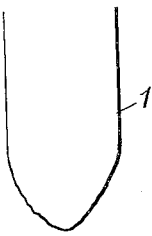
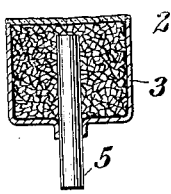
WITNESSES:
C. L. Belcher
Otto S. Schairer.
INVENTOR
George M. Little
BY
Wesley G. Carr
ATTORNEY

UNITED STATES PATENT OFFICE.

GEORGE M. LITTLE, OF PITTSBURG, PENNSYLVANIA, ASSIGNOR TO WESTINGHOUSE ELECTRIC & MANUFACTURING COMPANY, A CORPORATION OF PENNSYLVANIA.

ARC-LAMP ELECTRODE.

No. 931,133.   Specification of Letters Patent.   Patented Aug. 17, 1909.

Application filed September 3, 1907. Serial No. 391,240.

*To all whom it may concern:*

Be it known that I, GEORGE M. LITTLE, a citizen of the United States, and a resident of Pittsburg, in the county of Allegheny, and State of Pennsylvania, have invented a new and useful Improvement in Arc-Lamp Electrodes, of which the following is a specification.

My invention relates to electrodes for arc lamps and particularly to such electrodes as are adapted for use with other electrodes containing a material which is a conductor when fused, such, for example, as a mixture of magnetic oxid of iron and oxids of titanium and chromium.

The object of my invention is to provide an electrode of the character indicated, for use in lamps supplied from alternating current circuits, that shall be substantially non-consumable and that shall render the arc more luminous and steady than electrodes heretofore provided.

In another application Serial No. 316,132, filed by me May 10, 1906, I have disclosed an arc lamp having a metallic lower electrode and a composition upper electrode containing the magnetic oxid of iron and the oxids of titanium and chromium. In the operation of the lamp, set forth in said application, a pool of fused slag containing the said oxids forms upon the end of the composition electrodes, and, when the electrodes are brought together by the operation of the feeding mechanism, some of the fused slag is transferred to the lower metallic electrode. Some of the fumes or volatile oxids that are given off at the arc also deposit upon the metallic electrode and become fused into a slag. The arc thereafter plays between the pool of slag upon the end of the composition electrode and the slag that has been transferred to, or has been deposited upon, the metallic electrode. Since the arc thus produced is usually superior in luminosity and steadiness to the arc produced directly between the metallic electrode and the composition electrode, the presence of the slag upon the metallic electrode is highly important to the most successful operation of the lamp. In order to cause the slag upon the lower metallic electrode to attain such a degree of fluidity that it will spread over the entire end of the electrode and become so fastened thereto that it will not crack loose, I have heretofore provided a slender, substantially heat insulating support for the metallic electrode of such character that the heat produced by the arc will be but slowly conducted away from the electrode. In lamps that are employed in connection with direct current circuits, a lower electrode composed of iron and copper has been found highly satisfactory, but it is entirely unsuitable for use in alternating current lamps because of the presence of copper. Iron may be employed alone, if desired, but, because of its low fusing point, it becomes very readily oxidized and is therefore quite rapidly consumed.

The present invention provides an electrode the fusing point of which is so high that it is substantially non-consumable, or is but very slowly consumed, and for which the molten slag obtained from the composition electrode possesses such a positive degree of adhesion that the slag becomes securely fastened to it. The electrode is provided with a slender or heat-insulating support so that the molten slag is caused, by the intense degree of heat, to spread over the end of the electrode. A material which I have found suitable for use in such an electrode is an alloy of iron and chromium, the fusing point of which is considerably higher than that of the iron alone, and, for that reason, is but very slightly soluble in the molten slag and is not readily oxidized and consumed. I prefer to employ the material in the granular form in order to reduce the heat conductivity of the electrode and to provide further means for concentrating the heat of the arc upon the end of the electrode to assist in causing the slag to spread over it.

In the single figure of the accompanying drawing, which is a view, partially in elevation and partially in section, of an arc lamp that embodies my invention, an upper electrode 1 is preferably composed, as hereinbefore described, of the magnetic oxid of iron and the oxids of titanium and chromium, and a lower electrode 2 comprises a cup-shaped receptacle 3 composed of iron or other suitable material, and an alloy of iron and chromium contained within the receptacle. The alloy is preferably in granular form in order to decrease the heat conductivity of the electrode, and the receptacle is provided with a slender, substantially heat-insulating supporting rod 5 that extends upwardly into the receptacle.

While I prefer to employ an alloy of iron and chromium, other suitable conducting alloys or materials having high fusing points and for which the molten slag obtained from the upper composition electrode during the feeding operation of the lamp possesses such a degree of adhesion that the slag will spread over and become fastened to the lower electrode, may be employed, if desired.

I claim as my invention:

1. In an arc lamp, the combination with an electrode containing a material which is a conductor when fused, of another electrode containing an alloy of iron and chromium.

2. In an arc lamp, the combination with an electrode containing a material which is a conductor when fused, of another electrode containing a granulated alloy of iron and chromium.

3. In an arc lamp, the combination with an electrode containing a material which is a conductor when fused, of another electrode containing a conducting material having a higher fusing point than that of the aforesaid electrode and for which the fused material of the aforesaid electrode possesses a positive degree of adhesion.

4. In an arc lamp, the combination with an electrode containing a material which is a conductor when fused, of another electrode containing a granulated conducting material having a higher fusing point than that of the aforesaid electrode and for which the fused material of the aforesaid electrode possesses a positive degree of adhesion.

5. An arc lamp electrode containing a granulated alloy of iron and chromium.

6. An arc lamp electrode containing an alloy of iron and chromium.

7. An arc lamp electrode comprising a receptacle and a granulated alloy of iron and chromium contained within the receptacle.

In testimony whereof, I have hereunto subscribed my name this 23rd day of August, 1907.

GEORGE M. LITTLE.

Witnesses:
OTTO S. SCHAIRER,
BIRNEY HINES.